(12) United States Patent
Speth et al.

(10) Patent No.: US 6,257,745 B1
(45) Date of Patent: Jul. 10, 2001

(54) FLEXIBLE ARM LIGHT FOR AUTOMOBILE OVERHEAD CONSOLE

(75) Inventors: Stephan J. Speth, Orchard Lake; Lawrence J. Sak, Oxford, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/461,442

(22) Filed: Dec. 14, 1999

(51) Int. Cl.[7] .............................. B60Q 1/00; B60Q 1/26
(52) U.S. Cl. ..................... 362/488; 362/487; 362/419; 362/427; 362/490; 362/197; 362/287
(58) Field of Search ............... 362/85, 487, 488, 362/419, 427, 493, 197, 287, 428, 490, 479

(56) References Cited

U.S. PATENT DOCUMENTS

| | | | |
|---|---|---|---|
| D. 302,325 | 7/1989 | Charet et al. | D26/60 |
| D. 360,480 | 7/1995 | Hon | D26/37 |
| D. 377,840 | 2/1997 | Chang | D26/43 |
| 3,962,678 | 6/1976 | Kurokawa | 240/81 BD |
| 4,101,159 | 7/1978 | Stewart | 296/37.7 |
| 4,241,870 | 12/1980 | Marcus | 296/37.7 |
| 4,443,831 | 4/1984 | Godfrey et al. | 362/80 |
| 4,486,819 | 12/1984 | Marcus et al. | 362/142 |
| 4,511,954 | 4/1985 | Marcus et al. | 362/275 |
| 4,818,010 | 4/1989 | Dillon | 296/37.7 |
| 4,867,498 | 9/1989 | Delphia et al. | 296/37.7 |
| 5,040,990 | 8/1991 | Suman et al. | 439/34 |
| 5,331,525 | 7/1994 | Lawassani et al. | 362/140 |
| 5,546,288 | 8/1996 | Van Order et al. | 362/74 |
| 5,548,492 | 8/1996 | Hansen et al. | 362/83.1 |
| 5,564,771 | 10/1996 | Chesters | 296/97.5 |
| 5,671,996 | 9/1997 | Bos et al. | 362/83.1 |
| 5,713,623 | 2/1998 | Mattingly | 296/37.7 |
| 5,823,657 | * 10/1998 | Price et al. | 362/191 |
| 5,906,426 | * 5/1999 | Farrington et al. | 362/198 |

FOREIGN PATENT DOCUMENTS

2682652  * 10/1991  (FR) ................. 362/488

* cited by examiner

*Primary Examiner*—Sandra O'Shea
*Assistant Examiner*—Ali Alavi
(74) *Attorney, Agent, or Firm*—Donna L. Berry

(57) ABSTRACT

A flexible arm light for a motor vehicle having a passenger compartment equipped with an overhead console includes a first housing and a second housing interconnected by a flexible housing. The first housing includes a lamp coupled to the overhead console at a first location. The second housing is coupled to the console at a second location. The flexible arm light is operable in a stowed position and a deployed position wherein the flexible arm light is selectively directable toward a target when in the deployed position.

18 Claims, 4 Drawing Sheets

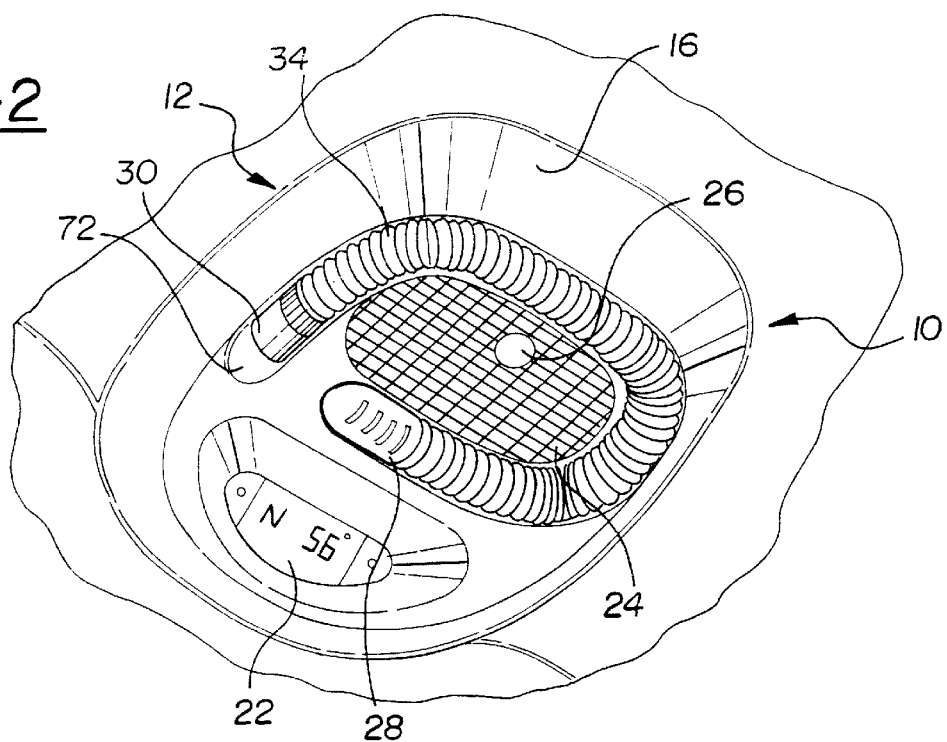
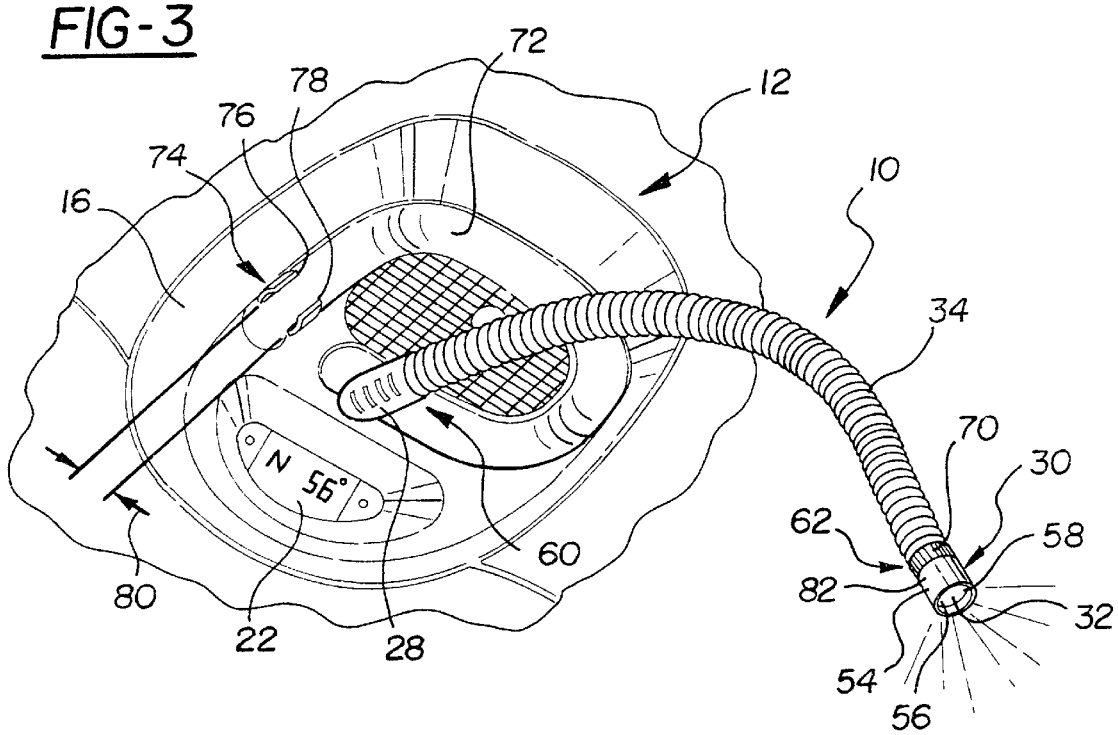

FLEXIBLE ARM LIGHT FOR AUTOMOBILE OVERHEAD CONSOLE

BACKGROUND OF THE INVENTION

1. Technical Field

The present invention generally relates to a lamp for use in an automobile. More specifically, but without restriction to the particular embodiment shown, the present invention pertains to a flexible arm light for an automobile overhead console.

2. Discussion

Automobiles have typically included courtesy lamps to assist the vehicle operator at night. One of the most common courtesy lamp locations is beneath the dashboard to indirectly light the lower portion of the passenger compartment. Another type of courtesy light is commonly located on the interior surface of the overhead roof panel of the vehicle. Some overhead courtesy lights include one single lamp operated by a single switch while other designs consist of two or more lamps controlled by separate switches.

While the courtesy lamps previously described have assisted the vehicle operator by illuminating the passenger compartment at night, improvements may be made. Specifically, existing overhead lamps have a tendency to broadly disperse light throughout the passenger compartment to maximize passenger compartment illumination. Such a lamp is useful when the vehicle is stopped but becomes an unwanted distraction when the driver is operating the vehicle. In addition, many of the overhead light assemblies currently provide light from a fixed position and do not enable the vehicle operator to direct the light toward an object intended to be viewed.

SUMMARY OF THE INVENTION

Accordingly, it is an object of the present invention to provide a flexible arm light for an automobile overhead console for selectively directing light to an object within the vehicle compartment.

It is another object of the present invention to provide a flexible arm light operable in an aesthetically pleasing stowed position and a deployed position where the light may be selectively directed at a variety of objects.

The present invention includes a flexible arm light for a motor vehicle having a passenger compartment equipped with an overhead console with a first housing and a second housing interconnected by a flexible housing. The first housing includes a lamp coupled to the overhead console at a first location. The second housing is coupled to the console at a second location. The flexible arm light is operable in a stowed position and a deployed position wherein the flexible arm light is selectively directable toward a target when in the deployed position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood fro the detailed description and the accompany drawings, wherein:

FIG. 2 is a perspective view of the overhead console of the present invention illustrated with the flexible arm light in a stored position;

FIG. 3 is a perspective view of the overhead console of the present invention illustrated similar to FIG. 2, but illustrating the flexible arm light in an operative position;

DETAILED DESCRIPTION OF THE PREFERRED EMBODIMENT

Figure 1:
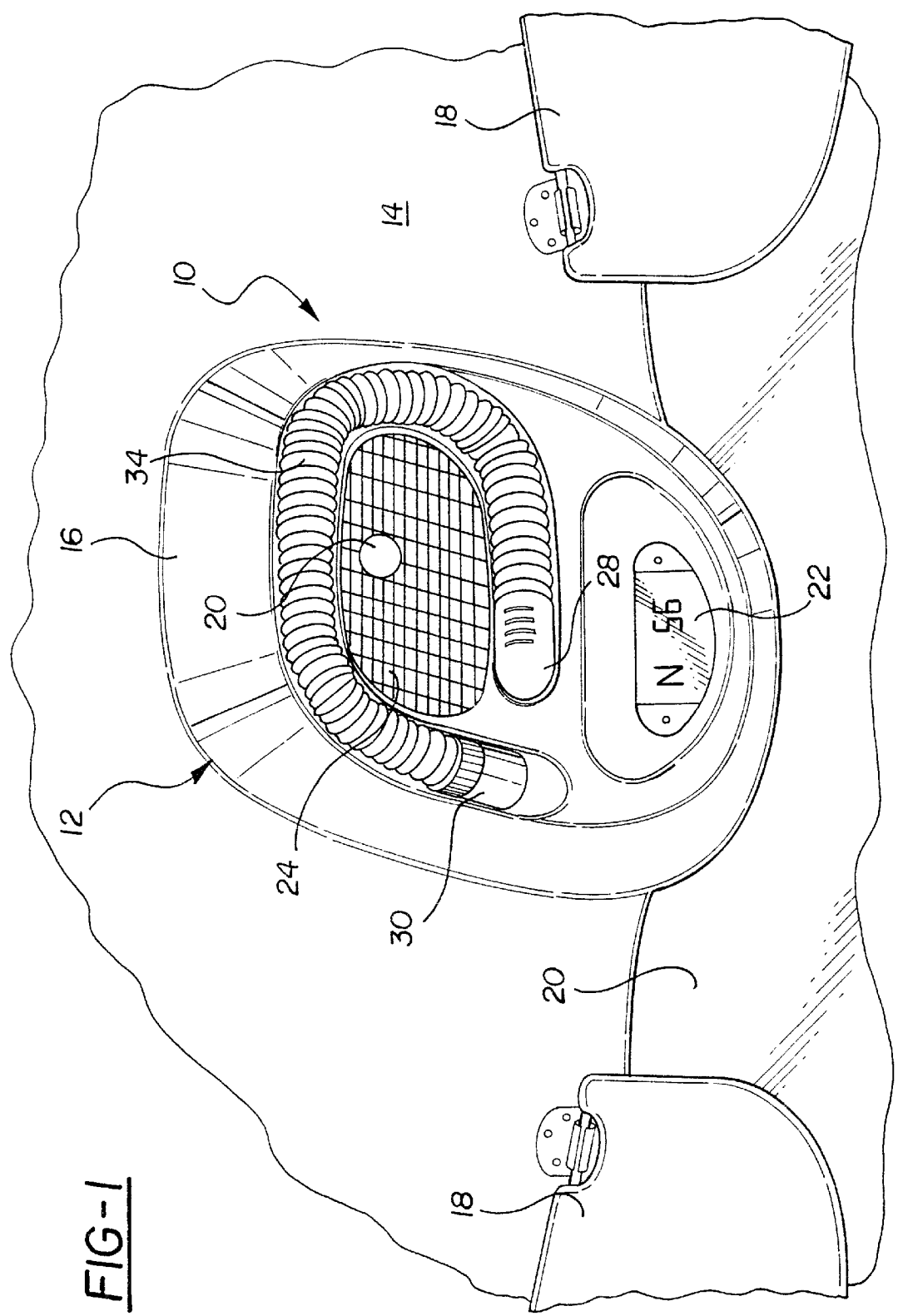
FIG. 1 is an environmental view of a portion of an exemplary motor vehicle incorporating an overhead console constructed in accordance with the teachings of a preferred embodiment of the present invention to include a flexible arm light.

With reference to FIG. 1, a flexible arm light constructed in accordance with the teachings of an embodiment of the present invention is generally identified at reference numeral 10. The flexible arm light is shown operatively associated with an overhead console 12 of an exemplary motor vehicle 14. As is common in the art, the overhead console 12 includes a cover 16 centrally positioned between a pair of sun shades 18 and mounted at the forward edge of a headliner 20. The overhead console 12 includes a digital display 22 for conveying information such as vehicle direction, ambient temperature, fuel economy and time of day to the vehicle occupants. The overhead console 12 also includes a conventional dome or courtesy light 24 having a switch 26 for selective operation thereof.

Referring to FIGS. 2 and 3, the flexible arm light 10 is illustrated to generally cooperate with the cover 16 of the overhead console 12. In the preferred embodiment, the flexible arm light 10 is operable in an aesthetically pleasing stowed position (FIG. 2) and a deployed position (FIG. 3) where the flexible arm light 10 may be selectively directed towards an intended target.

Figure 9:
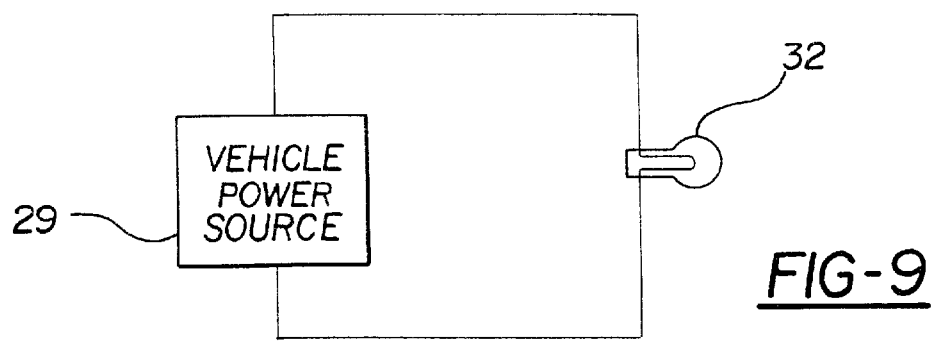
FIG. 9 is a schematic view illustrating electrical connection between the lamp of the flexible arm light and the vertical power source.

The flexible arm light 10 includes a first end or housing 28 connected to a vehicle power source 29 (shown schematically in FIG. 9), a second end or housing 30 for mounting a lamp 32 therein and a flexible hose portion 34 interconnecting the first housing 28 and the second housing 30. The first housing 28 includes an attachment mechanism 36 (FIG. 6) for securing the flexible arm light 10 to the cover 16 of the overhead console 12. In the preferred embodiments, the attachment mechanism 36 functions to allow the first housing 28 to rotate when deploying the flexible arm light 10 as shown in FIG. 3 However, it should be appreciated that the flexible hose portion 34 provides an operator with ample positioning freedom and that the first housing 28 may be fixedly attached to the cover 16 without departing from the scope of the invention as defined in the appended claims.

Figure 4:
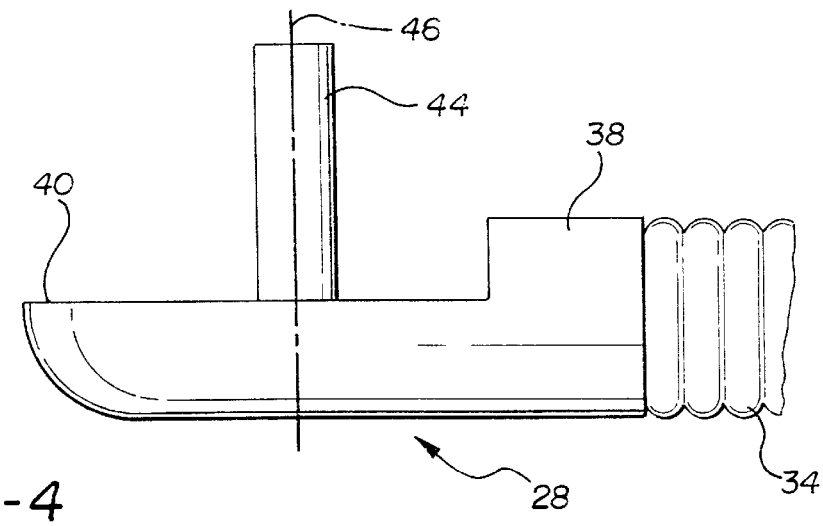
FIG. 4 is a side view of one end of the flexible arm light of the present invention.
Figure 5:
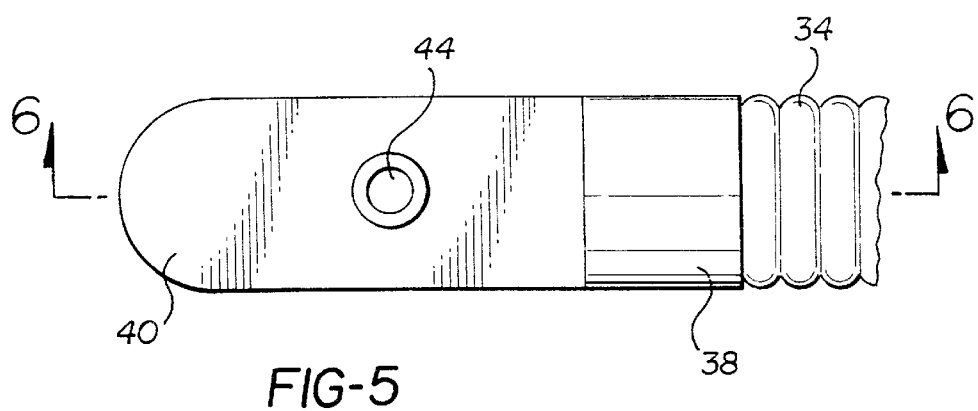
FIG. 5 is a top view of the end of the flexible arm light illustrated in FIG. 4.
Figure 6:
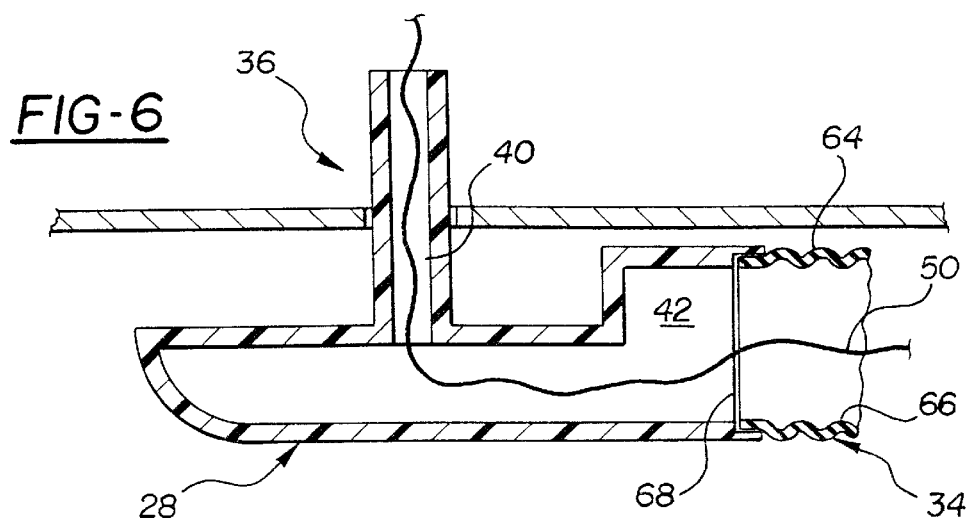
FIG. 6 is a cross-sectional view taken along the line 6—6 in FIG. 5.

Referring to FIGS. 4–6, a first embodiment of the first housing 28 includes generally cylindrical body 38 having a truncated face 40 wherein the body 38 nd the truncated face 40 define a receptacle 42. The first housing 28 also includes a hollow pivot pin 44 extending orthogonally from the truncated face 40. The pivot pin 44 defines an axis of rotation 46 about which the first housing 28 is free to rotate as the flexible arm light 10 is moved from the stowed position to the deployed position. The axis of rotation 46 is horizontally oriented. Specifically, as an occupant directs the lamp 32 toward a target, the first housing 28 rotates about the axis of rotation 46 and the truncated face 40 passes a portion of the cover 16 without interference. As shown in FIG. 6, the hollow pivot pin 44 includes an aperture 48 in communication with the receptacle 42 for receipt of a wire 50. The wire 50 is utilized to conduct current to the lamp 32 from the vehicle power source. At assembly, the pivot pin 44 is disposed within an aperture (not shown) located within the cover 16 and rotatably coupled thereto in a manner commonly known in the art such as via snaps, clips or other mechanical fasteners so as to prevent complete withdrawal.

As best seen in FIG. 3, the second housing 30 includes a generally cylindrical hollow tube 54 configured to receive the lamp 32, a reflector 56, and a lens 58. The flexible hose portion 34 includes a first end 60 coupled to the first housing 28 and a second end 62 coupled to the second housing 30. With particular reference to FIG. 6, the flexible hose portion 34 also includes a positioning mechanism 63 having an elastomeric outer sheathing 64 covering a flexible framework 66. The flexible framework 66 is preferably constructed from a thin-walled corrugated metal tube. However, it should be appreciated that the flexible framework 66 may include a variety of components such as interconnected circular rings, alternating metal and composite members or interconnected wire portions among others.

It should be appreciated that the positioning mechanism 63 allows an operator to direct the lamp 32 at a target for illumination thereof. It should also be appreciated that the positioning mechanism 63 functions to maintain the position of the lamp 32 by resisting movement of the flexible framework 66 from its present shape. Accordingly, once the lamp position is set, the vehicle occupant may use the present invention while having both hands free.

The second end 62 of the flexible hose portion 34 is coupled to the second housing 30 via a clamp band 70 while the first end 60 of the flexible hose portion 34 includes a retaining ring 68 for interconnecting the flexible hose portion 34 to the first housing 28. One skilled in the art should appreciate that the retaining ring 68 and the clamp band 70 are merely exemplary methods of attaching the flexible hose portion 34 to each of the first and second housings 28 and 30, respectively. Accordingly, other means of attachment such as adhesive bonding, mechanical fastening, or snap-fit coupling are within the scope of the present invention.

With reference to FIG. 2, the flexible arm light 10 is shown operable in the stowed position. Specifically, the flexible arm light 10 is placed in the stowed position by disposing the first housing 28, the second housing 30 and the flexible hose portion 34 within a channel 72 formed in the cover 16 and positioned about the periphery of the dome light 24. As shown in FIGS. 2 and 3, the channel 72 has a semi-circular cross section to compliment the outer diameter of each of the housings defining the flexible arm light 10. In addition, the channel 72 is preferably of sufficient length to accept the entire flexible arm light 10 in the stowed position as depicted in FIG. 2.

As shown in FIG. 3, the cover 16 of the overhead console 12 further includes a retention mechanism 74 for securing the flexible arm light 10 in the stowed position. The retention mechanism 74 includes a first clip 76 and a second slip 78 preferably constructed from a resilient material such as a composite or spring steel. Each of the clips 76 and 78 are positioned within the channel 72 and spaced apart a distance 80 less than the outer diameter of the second housing 30. Accordingly, as the second housing 30 is displaced towards the channel 72, an outer surface 82 of the hollow tube 54 biasedly engages each of the clips 76 and 78 and causes the clips to deform outwardly, thereby allowing the first housing 28 to pass. After the second housing 30 is seated within the channel 72, the clips 76 retain the flexible arm light 10 in its stowed position by maintaining a biasing force thereupon.

One skilled in the art will appreciate that the flexible arm light 10 is also operable in a deployed position as shown in FIG. 3. The flexible arm light 10 may be placed in the deployed position by simply overcoming the biasing force generated by the first clip 76 and the second clip 78 upon the second housing 30. Preferably, this operation may be accomplished by inserting one of the operator's fingers into the channel 72 and detaching the second housing 30 from the retention mechanism 74. At this time, the lamp 32 may be directed at the desired target.

Figure 7:
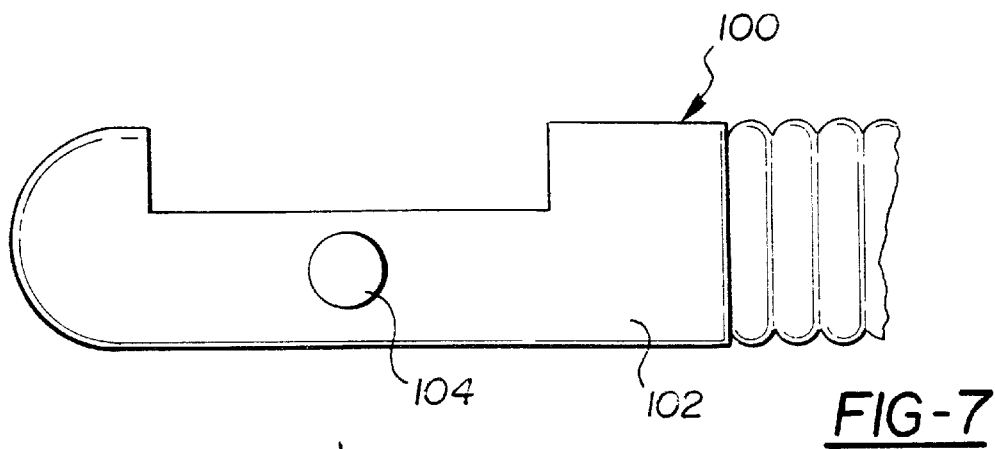
FIG. 7 is a side view of a second embodiment of one end of the flexible arm light constructed in accordance with the teachings of the present invention.
Figure 8:
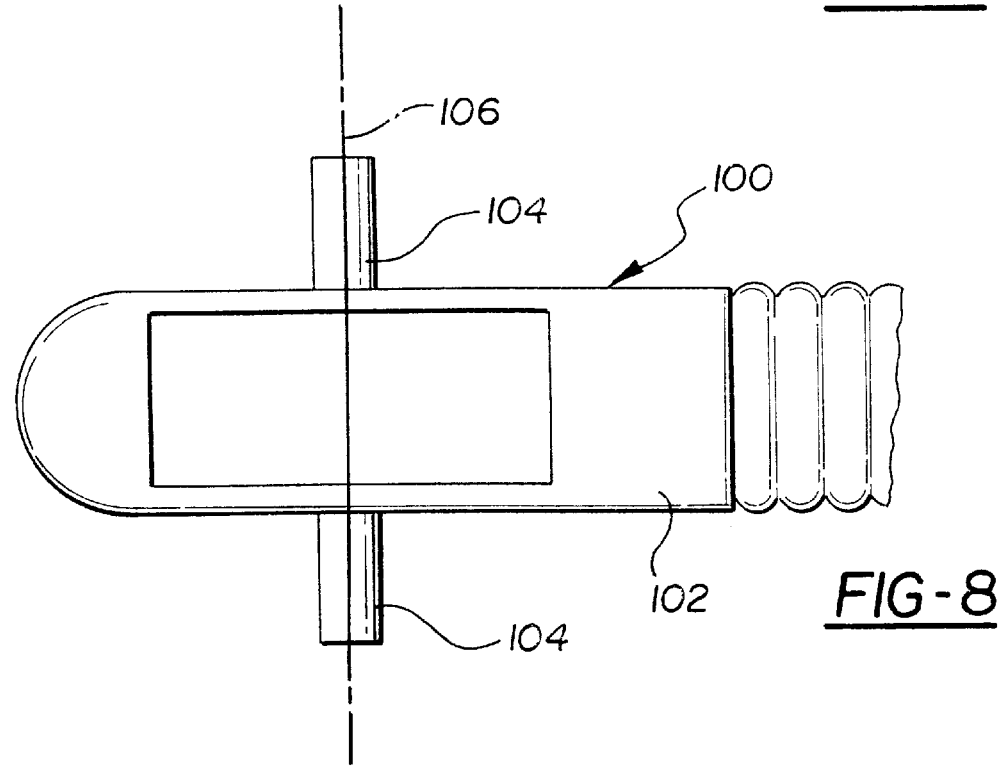
FIG. 8 is a top view of the end of the flexible arm light illustrated in FIG. 7.

With reference to FIGS. 7 and 8, a second embodiment of the first housing of the present invention is depicted at numeral 100. One skilled in the art will appreciate that the second embodiment of the first housing 100 performs functions very similar to those described in relation to the first embodiment of the first housing 28. Accordingly, only the differences in the embodiments will be described in detail hereinafter.

The first housing 100 includes a generally cylindrical body 102 having a pair of axially aligned trunions 104 extending radially therefrom. The first housing 100 is coupled to the cover 16 by a method commonly known in the art such as clips which allow the first housing 100 to rotate about an axis 106 which is vertically oriented. One skilled in the art will appreciate that axis 106 is orthogonally oriented relative to the axis of rotation 46 of the first embodiment. Accordingly, a vehicle designer may choose the appropriate housing embodiment based upon the position of the console within the vehicle 14 and the desired use of the flexible arm light. It should be apparent from the previous discussion that the flexible arm light 10 is not limited for use within an overhead console and may be implemented in a variety of locations within the vehicle without departing from the scope of the appended claims.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed:

1. A flexible arm light for a motor vehicle having a passenger compartment in combination with an overhead console, the flexible arm light comprising:
   a first housing;
   a second housing spaced apart from said first housing including a lamp;
   a flexible housing interconnecting said first housing and said second housing;
   said first housing coupled to said overhead console at a first location, said second housing coupled to said console at a second location, said flexible arm light operable in a stowed position and a deployed position wherein said flexible arm light is selectively directable toward a target when in said deployed position.

2. The flexible arm light of claim 1 wherein said first housing, said second housing and said flexible housing are disposed within a channel formed in said console when said flexible arm light is in said stowed position.

3. The flexible arm light of claim 2 wherein said second housing is adapted for mounting to said console in a snap-fit coupling when said flexible arm light is in said stowed position.

4. The flexible arm light of claim 1 wherein said first housing is pivotable relative to the console about an axis of rotation.

5. The flexible arm light of claim 1 wherein said flexible housing includes a positioning mechanism to restrain said lamp from further movement after initially positioning said flexible arm light.

6. The flexible arm light of claim 1 wherein said lamp is adapted to be electrically connected to a vehicle power source.

7. The flexible arm light of claim 4, wherein said axis of rotation is horizontally oriented.

8. The flexible arm light of claim 4, wherein said axis of rotation is vertically oriented.

9. An overhead console for a motor vehicle having a roof panel, said overhead console comprising:
   a cover adapted for mounting to the roof panel;
   a flexible member having a first end and a second end, said first end coupled to said cover, said second end including a lamp electrically connected to a power source, said second end selectively connectable to said cover for operating said flexible member in a stowed position, said flexible member operable in a deployed position for directing said lamp toward a target.

10. The overhead console of claim 9 wherein said cover includes a channel for receipt of said flexible member when in said stowed position.

11. The overhead console of claim 9 further including a courtesy light separately operable from said lamp.

12. The overhead console of claim 9 wherein said first end of said flexible member includes a first housing pivotably coupled to said cover.

13. The overhead console of claim 12 wherein said second end of said flexible member includes a second housing for mounting said lamp, a lens and a reflector.

14. The overhead console of claim 13 further including a retention mechanism for selectively securing said second housing to said cover.

15. The overhead console of claim 14 wherein said retention mechanism includes a pair of clips biasedly engaging said second housing.

16. The overhead console of claim 9, wherein said first end is pivotally coupled to said cover for relative rotation about a pivot axis.

17. The overhead console of claim 16, wherein said pivot axis is horizontally oriented.

18. The overhead console of claim 16, wherein said pivot axis is vertically oriented.

* * * * *